United States Patent [19]

Sonoda et al.

[11] 4,439,322

[45] Mar. 27, 1984

[54] POLYMETHYL METHACRYLATE MEMBRANE

[75] Inventors: Takeshi Sonoda; Yoshitaka Tanaka; Shigenori Takenaka, all of Kamakura; Tatsuo Nogi, Otsu, all of Japan

[73] Assignee: Toray Industries, Inc., Tokyo, Japan

[21] Appl. No.: 278,570

[22] Filed: Jun. 29, 1981

[30] Foreign Application Priority Data

Jul. 2, 1980 [JP] Japan .................................. 55-89100

[51] Int. Cl.³ .............................................. B01D 31/00
[52] U.S. Cl. ................................ 210/500.2; 264/178 F
[58] Field of Search .............. 210/638, 653, 654, 655, 210/500.2, 490, 491; 55/16, 158; 264/178 F, 184, 185, 141, 233; 521/27, 28

[56] References Cited

U.S. PATENT DOCUMENTS

| | | | |
|---|---|---|---|
| 3,276,598 | 10/1966 | Michaels et al. | 210/500.2 |
| 3,546,142 | 1/1967 | Michaels et al. | 521/27 |
| 3,615,024 | 10/1971 | Michaels | 210/490 |
| 4,035,459 | 7/1977 | Kesting | 264/184 X |
| 4,127,625 | 11/1978 | Arisaka et al. | 55/16 X |
| 4,262,041 | 4/1981 | Eguchi et al. | 427/245 |

FOREIGN PATENT DOCUMENTS

| | | | |
|---|---|---|---|
| 54-146278 | 11/1979 | Japan | 210/500.2 |
| 110619 | 2/1961 | Pakistan | 210/638 |

*Primary Examiner*—Frank A. Spear, Jr.
*Attorney, Agent, or Firm*—Austin R. Miller

[57] ABSTRACT

A membrane for microfiltration, ultrafiltration or dialysis comprises a methyl methacrylate copolymer containing about 0.5 to 10 mol % of a monomer having sulfonate groups, and a methyl methacrylate copolymer containing about 0.5 to 10 mol % of a monomer having quaternary nitrogen-containing groups. It is manufactured by mixing those copolymers, dissolving the mixture in a solvent such as dimethylsulfoxide or dimethylformamide, and forming a membrane from a solution of the copolymers by casting or spinning. The membrane is particularly suitable for use in the purification of blood, and its most preferable form is hollow fibers. A method of preparing hollow fibers comprises extruding the copolymer solution through a spinneret having an annular orifice defined by a thin central tube while a liquid or gas is being injected into the central tube, and coagulating the extrusion product.

19 Claims, No Drawings

POLYMETHYL METHACRYLATE MEMBRANE

BACKGROUND OF THE INVENTION

1. Field of the Invention

This invention relates to a novel separation membrane which is suitable for microfiltration, ultrafiltration, dialysis and in general for concentration of aqueous solutions, and which is also suitable for separation of materials.

2. Description of the Prior Art

Methods involving separating materials by employing membranes have recently been drawing great attention in various fields by technology and industry, including waste water disposal, food industry and medical applications. These methods include microfiltration, ultrafiltration and dialysis, and are selectively employed to suit the particle sizes of materials floating, dispersed or dissolved in an aqueous medium. While different types of membranes are, of course, used for different purposes of separation, all the membranes are required to have a high rate of permeation to an aqueous medium, to be highly capable of removing the materials floating, dispersed or dissolved therein, and to have a high degree of mechanical strength and chemical resistance.

Many separation membranes are known such as those disclosed, for example, in U.S. Pat. Nos. 3,546,142; 3,896,061 and 4,118,439, but few of them fully satisfy the requirements mentioned. Moreover, it has been difficult to manufacture different types of membranes for different applications from one and the same material by one and the same process.

SUMMARY OF THE INVENTION

It is a general object of this invention to provide a membrane which has a wide permeability range and is well suited for microfiltration, ultrafiltration or dialysis, and which satisfies other applicable requirements to a practically acceptable extent, and which can be manufactured by a single controllable process in which the proportions of ingredients and additives may easily be appropriately adjusted.

It is particularly an object of this invention to provide a polymethyl methacrylate membrane having an outstanding degree of compatibility with blood, and which is suitable for use in an artificial kidney or liver for plasmapheresis, and in other systems utilized for the purification of blood.

DETAILED DESCRIPTION OF THE INVENTION

Flat, tubular and hollow fiber membranes are three typical forms of selectively permeable membranes, and each has its own advantages. A hollow fiber membrane is, however, the most preferable form, since it has a large surface area, and can be used in a small or compact apparatus or module without any substantial loss of membrane material.

According to a preferred aspect of this invention, the membrane is used for the purification of blood, for example, for the separation of plasma from the solids in the blood, the treatment of immuno-diseases, such as rheumatoid arthritis, SLE and renal disease, by separating an immune complex and other high molecular weight proteins from albumin and other low molecular weight proteins, or in the refining of culture sera by removing a cell proliferation inhibitor or otherwise, or for application in artificial kidneys.

A membrane for plasma separation is required to have a high rate of plasma filtration without causing any hemolysis or coagulation of blood, and must at the same time be highly permeable to albumin, globulin and other plasma proteins. However, it should be totally impermeable to red and white blood cells and to platelets. While the rate of plasma filtration depends on the hematocrit value of blood, on the concentration of proteins, on the flow rate of blood, on the filtration pressure and the like, clinical application of the membrane requires a plasma filtration rate of about 30 to 60 ml/min. when the blood is flowing at a rate of 100 ml/min. In this connection, the membrane is required to have an albumin permeability of at least 90%, preferably substantially 100%, and to have a water permeation rate (water UFR, or UFRS) of about 2 to 60 liters/hr.m$^2$.mmHg, preferably about 4 to 30 liters/hr.m$^2$.mmHg. In other words, the membrane is required to have a high degree of porosity, and to have a pore diameter of about 0.1 to 0.8 micron.

Although the particle sizes of the proteins to be separated depend on the nature of the disease involved, or on the purpose of the culture, membranes used in treatment of immuno-diseases, or in refining of culture sera, are required to have albumin permeabilities of about 30 to 100%, preferably 70 to 100%, and to have water permeabilities of about 0.1 to 20 liters/hr.m$^2$.mmHg, preferably 1 to 10 liters/hr.m$^2$.mmHg. In other words, the membrane is required to have a high degree of porosity, and to have a pore diameter of about 0.01 to 0.2 micron.

Important factors which require consideration in membranes for use in artificial kidneys include solute permeability, ultrafiltration power, blood compatibility and mechanical strength. The membrane is desired to have a high degree of solute permeability, but not so high that plasma proteins, particularly albumins, can permeate it. It is preferable for the membrane to have a widely variable rate of ultrafiltration, since the quantity of water to be removed is likely to differ widely from one patient to another. It is desired to provide a semipermeable membrane having a very high ultrafiltration rate in view of the fact that the membrane is not only used for ordinary hemodialysis, but also for hemofiltration, or in portable or built-in types of artificial kidneys in which the technique of hemofiltration is applied. More specifically, while membranes for ordinary hemodialysis are required to be substantially impermeable to albumin and to have water ultrafiltration rates (UFR) of about 1 to 10 ml/hr.m$^2$.mmHg, preferably 3 to 6 ml/hr.m$^2$.mmHg, membranes for hemofiltration or like purposes are required to have water ultrafiltration rates of at least about 20 ml/hr.m$^2$.mmHg, preferably higher if it is impermeable to albumin.

The water ultrafiltration rate and albumin permeability of the membrane are determined in a customary manner by using distilled water, and a solution of bovine albumin (Fr. V) (e.g., product of Seikagaku Kogyo Co., Ltd., or Sigma) in distilled water having a concentration of 0.2 g/dl, respectively. The albumin permeability of the membrane is determined by using an ordinary stirring type cell, such as Amicon's Standard cell 52, if the membrane is a flat one, or using a module composed of a bundle of at least 10 hollow fibers and having an effective length of at least 5 cm if the membrane is a hollow fiber membrane. The solution is stirred in a stirring cell, or passed through the hollow fibers at an entering linear velocity of at least 5 cm/sec., at a temperature of 25° C. and a pressure of 50 mmHg. Determination of permeability is based on the filtrate obtained during a period of 30 minutes after it has been stabilized with a lapse of 30 to 60 minutes, and is calculated as follows:

$$\text{Permeability} = \frac{\text{Concentration of albumin in the filtrate}}{\text{Concentration of albumin in the original solution}} \times 100\,(\%)$$

The membrane of this invention is essentially manufactured from two kinds of polymers, i.e., (A) a methyl methacrylate copolymer containing about 0.5 to 10 mol % of a polymerizable monomer having a sulfonate group, and (B) a methyl methacrylate copolymer containing 0.5 to 10 mol % of a polymerizable monomer having a quaternary nitrogen-containing group. According to this invention, the degree of copolymerization, the mix ratio of the copolymers, the concentration of glycerin or formamide in the solvent, and the concentration of the polymers in the spinning solution are appropriately adjusted to provide various kinds of membranes for various applications by a single process. As one of the copolymers is of the polyanionic type having a sulfonate group, and the other of the polycationic type having a quaternary nitrogen-containing group, the membrane which is manufactured therefrom is an ionically crosslinked polyion complex membrane. Since it has a high degree of mechanical strength, and a high degree of blood compatibility, it is particulary suitable for use in medical applications in which it is exposed to blood.

Examples of monomers having a sulfonate group, which is to be copolymerized with methyl methacrylate, include p-styrenesulfonic acid, allylsulfonic acid, methacrylsulfonic acid, 3-methacryloxypropanesulfonic acid, vinylsulfonic acid, 3-acryloxypropanesulfonic acid, and 2-acryl-amino-2-methylpropanesulfonic acid, and the sodium, potassium, ammonium and pyrridine salts thereof. It is preferable to use an alkali metal salt of any such acid, particularly sodium p-styrenesulfonate. These monomers are copolymerized with methyl methacrylate to the extent that the resulting copolymer may not be dissolved in water, and are employed in the range of usually about 0.5 to 10 mol %, preferably about 1 to 5 mol %.

The other copolymer is obtained by copolymerizaing a monomer having a quaternary nitrogen-containing group with methyl methacrylate to the extent that the resulting copolymer may not be dissolved in water. Thus, this monomer is employed in the range of usually about 0.5 to 10 mol %, preferably about 1 to 5 mol %. Examples of applicable monomers having a quaternary nitrogen-containing group include 2-methacryloyloxyethyltrimethylammonium chloride, 2-methacryloyloxyethyltriethylammonium chloride, diemthyl(2-methacryloyloxyethyl)phenylammonium chloride, 2-acryloxyethylammonium chloride, 2-hydroxy-3-methacryloyloxypropyltrimethylammonium chloride, vinylbenzyltrimethylammonium chloride, and methyl(2-methyl-5-vinyl) pyridinium chloride. It is, of course, possible to use a bromide, iodide, sulfate, sulfonate or the like instead of such chloride.

A methyl methacrylate copolymer containing a monomer having a quaternary nitrogen-containing group may also be prepared by copolymerizing methyl methacrylate with a monomer having a tertiary nitrogen group and quaternizing the resulting copolymer in a known manner with a known quaternizing agent. For example, it is possible to obtain a desired copolymer by copolymerizing methyl methacrylate with dimethylaminoethyl methacrylate, and reacting the resulting copolymer with an alkyl halide to convert it to a quaternary ammonium salt. The copolymer of 2-methacryloyloxyethyltrimethylammonium chloride methyl methacrylate is, among others, preferred for use in the preparation of membranes.

It is also possible to use, for preparing the membrane of this invention, a methyl methacrylate copolymer containing a monomer having a sulfonate group or a quaternary nitrogen-containing group, and further containing a small quantity of at least one vinyl monomer, if it is soluble in the solvent used for the preparation of the membrane.

The two copolymers (A) and (B) may be mixed in a weight ratio of about 1:9 to 9:1. This mix ratio is preferably selected to ensure that the numbers of the sulfonate and quaternary nitrogen-containing groups in the copolymers have a ratio of about 5:1 to 1:5, preferably about 2:1 to 1:2. More preferably from the standpoint of membrane strength, an ion complex should be formed of substantially equal numbers of sulfonate and quaternary nitrogen-containing groups. For a membrane used for an artificial kidney or liver, or for plasmapheresis, or for other applications in which the membrane is exposed directly to blood, it is preferable to employ a mix ratio which ensures that the numbers of the sulfonate and quaternary nitrogen-containing groups in the copolymers have a ratio of 2:1 to 1:1, so that the membrane is anionic or neutral.

When the two copolymerss are mixed to prepare a membrane forming solution or spinning solution, it is of course possible within the spirit of this invention to add a small quantity of polymethyl methacrylate or isotactic polymethyl methacrylate having a varying degree of polymerization in order to control the viscosity of the solution, or to control the mechanical strength of the membrane to be formed, or for other purposes.

The copolymers from which membranes are manufactured may have molecular weights which depend on the membrane-forming or spinning method employed, the mechanical properties of the membrane as required by the purpose for which it will be used, and other factors. They preferably have weight-average molecular weights of at least about 100,000, preferably about 200,000 to 800,000 when they are mixed. This molecular weight may be calculated in accordance with the following equation representing the viscosity of a chloroform solution of polymethyl methacrylate:

$$[\eta] = 4.8 \times 10^{-5} M^{0.8}$$

In order to prepare a copolymer solution from which a membrane is formed or spun, it is necessary to use a solvent which can dissolve the copolymers and utimately be replaced by water. According to this invention, however, it is not necessary to use any ionic shielding solvent of the type usually required for dissolving a polyelectrolyte complex. It is possible to use as the solvent dimethylsulfoxide, dimethylformamide, dimethylacetamide, N-methylpyrrolidone, dichloromethane, acetonitrile, acetone, methyl ethyl ketone, methyl cellosolve, methyl carbitol or the like, or a mixture thereof.

Among others, dimethylsulfoxide and dimethylformamide can be used advantageously to provide a membrane having a wide range of pore diameters if the average molecular weight of the copolymers, the concentration of the copolymer solution, and the additives which will hereinafter be described, are appropriately selected.

The selection from which the membrane is formed or spun may have a concentration of about 4 to 40% by weight, and preferably about 5 to 35% by weight, although it depends on the solvent to be used, the method by which the membrane is manufactured, the pore diameter thereof to be obtained, and other factors.

When preparing the solution, it is preferable to add water, formamide, an alcohol such as butanol, propanol, ethylene glycol or glycerin, or a non-solvent such as urea or calcium chloride, or a surface active agent such as polyoxyethyleneetherlauryl alcohol (Brij-35) or isooctylphenoxypolyethoxy ethanol (Triton X-100), or polyethylene glycol in order to manufacture a membrane having a pore diameter which is suitable for the purpose for which it is used. Water, glycerin and formamide are particularly preferred for incorporation into a solution from which an ultrafiltration or plasma separation membrane having a large pore diameter is to be manufactured. Glycerin is preferable to formamide for use in the manufacture of a membrane for medical applications, since the former is much lower in toxicity than the latter.

In order to obtain a crosslinked polymethyl methacrylate membrane having an albumin permeability of at least 30% and a water ultrafiltration rate (UFR) of 0.1 to 60 liters/hr.m$^2$.mmHg according to this invention, it is preferable to use as the solvent dimethylsulfoxide (DMSO) or dimethylformamide (DMF) containing about 5 to 40% by weight of glycerin or formamide. An increase in the quantity of glycerin or formamide generally tends to result in a membrane having a larger pore diameter and a higher degree of permeability.

The concentration of the copolymers in the solution thereof, which affects the water permeability of the membrane most significantly, is usually in the range of 4 to 40% by weight, and preferably in the range of 5 to 35% by weight, and more preferably in the range of 10 to 25% by weight.

The solution thus prepared can be formed into a membrane or spun into hollow fibers by a variety of methods known in the art. For example, it is possible to form a flat membrane by casting the solution on a flat glass, metal or like plate and immersing the plate in a coagulating bath for solidifying the solution, or by extruding the solution into a coagulating bath through a spinneret having a thin, elongated orifice. It is also possible to use a supporting fabric, such as a polyester taffeta, and coat it with the solution. A cylindrical or hollow fiber membrane may be formed by extrusion through a spinneret having an annular orifice. If the shape defined by the solution when it has been extruded is deformed into other shapes before coagulation, it is possible to obtain membranes having a variety of irregular shapes, such as convex and concave, etc.

Although the membrane of this invention can be manufactured in a variety of shapes as hereinabove described, a hollow fiber membrane is most suitable for medical or like applications, since it can be manufactured at a high linear velocity, and a module prepared therefrom has a small priming volume.

The solution may, in some cases, have to be heated during its preparation, since some components thereof, particularly the solvent, are likely to cause gelation of the solution at a low temperature. This is particularly the case when dimethylsulfoxide is used as the solvent. A solution containing dimethylsulfoxide sets in the form of a gel at a temperature which is lower than, say 110° C., or even below 90° C. This phenomenon is, however, utilized advantageously for the formation of hollow fiber membranes or the like. It makes it possible to form a membrane by injecting a gas, instead of a liquid, for internal coagulation in a dry and wet spinning process. It is, of course, possible to inject a liquid for internal coagulation as in an ordinary dry and wet spinning process, or a wet spinning process.

The coagulating bath usually comprises water or a lower aliphatic alcohol, or a mixture thereof. It is also possible to use a mixture of water and/or a lower alcohol with the solvent for the solution from which the membrane is formed, and an inorganic salt, an acid or alkali, or the like in order to control the coagulating power of the bath. It is, however, preferable to use a coagulating bath composed of dimethylsulfoxide and water if dimethylsulfoxide is used as the solvent for preparing the solution from which the membrane is formed.

The temperature of the coagulating bath has a significant effect on the water permeability of a semipermeable membrane. Generally, a high coagulating bath temperature appears to provide a membrane having a high degree of water permeability. The coagulating bath usually has a temperature of about 0° C. to 98° C.

The membrane of this invention remains free from any appreciable change in permeability and mechanical properties for a long period of time if it is kept in a wet condition. It is entirely possible to store the membrane in a dry condition if an appropriate wetting agent, such as hydrated glycerin, is employed. Other examples of suitable wetting agents include ethylene glycol, polyethylene glycol and various kinds of surface active agents. It is possible to alter the permeability or mechanical properties, such as dimensional stability, of a membrane by heating it at a usual temperature of about 50° C. to 110° C., preferably about 70° C. to 90° C., while some tension may or may not be applied to the membrane.

Description will now be made in further detail of the method for the manufacture of a hollow fiber membrane which is the most preferable form of membrane according to this invention. A hollow fiber membrane is manufactured by a dry and wet spinning process from a solution prepared as hereinabove described. Although any ordinary spinneret used for spinning hollow fibers can be used for forming a hollow fiber membrane according to this invention, it is preferable for the purpose of this invention to use a spinneret having an annular orifice defined around a thin, central tube. While many methods are known for spinning hollow fibers by using such a spinneret, the separation of materials which this invention takes into consideration requires a hollow fiber membrane having a uniform and substantially exactly circular cross section.

According to this invention a hollow fiber is formed while a solvent is injected into the hollow fiber at a constant rate through a central tube in a spinneret. The solvent is one which is also used in the spinning solution, or is a mixture thereof with water or a polyhydric alcohol. This liquid injection is important, since it contributes to the formation of the inner wall of the hollow fiber when the liquid contacts the spinning solution.

The liquid must be selected appropriately to suit the properties of the spinning solution, and to suit the purpose for which the membrane will be used. For example, if the membrane is intended for use in the purification of blood, it is necessary to be careful not to allow the solution to solidify too quickly, so that a hollow fiber having a uniform inner wall may be obtained. A mixture of the solvent and water is usually prepared so as to contain not more than about 40% of water. Substantially the same is true of a mixture of a polyhydric alcohol and water. Examples of the polyhydric alcohol which can usually be employed include glycerin, ethylene glycol, diethylene glycol and propanediol. The composition of the liquid may be varied for controlling the separation capacity of the hollow fiber membrane, also.

According to this invention, it is also possible to form a hollow fiber by injecting a gas into the hollow interior thereof. Although it is very difficult to effect injection of a gas with an ordinary spinning solution, the spinning solution which is employed by this invention permits it, since it undergoes gelation by forming an ion complex at a temperature which is lower than a certain level, and in some cases causes phase separation, resulting in a tendency of a hollow fiber to have a fixed shape. Although the gelation temperature of the solution depends largely on the proportions of the polymers in the solution, the presence or absence of any additive therein, and the kind and quantity of additive or additives therein, if any, has an effect. It is generally possible to form a hollow fiber by injecting a gas if the spinning operation is performed at a temperature at least 5° C. to 10° C. higher than the gelation temperature of the solution. Although there is no limitation in particular to the nature of the gas to be injected, it is usually appropriate to use air, nitrogen or another inert gas.

It is also important to select the spinneret temperature appropriately. If the spinneret temperature is relatively low, rapid gelation of the spinning solution promote phase separation between the solvent and the polymer with resultant formation of a hollow fiber membrane having a relatively large pore diameter. A relatively dense membrane having a relatively small pore diameter can be formed if the fiber is spun slowly at a relatively high spinneret temperature. Although the nature of the spinning solution has to be taken into account, it is possible to manufacture a hollow fiber membrane which is useful for separation purposes if the temperature of the spinning solution is maintained at at least about 50° C., and preferably in the range of about 50° C. to 140° C.

A sol in the form of a hollow fiber ejected through a spinneret turns into a gel while passing through air or through an inert gas, and is guided into a coagulating bath. According to this invention, it is important to accomplish satisfactory gelation of the hollow fiber in the form of a sol upon extrusion from the spinneret prior to coagulation. Although the environmental conditions which gelation requires depend on spinning speed and temperature, the thickness of the fiber which is spun and the like, it is usually preferable to space the coagulating bath apart from the spinneret by a distance of at least about 0.1 cm, and more preferably about 0.2 to 200 cm. Any deviation from this range may result in difficulty in stabilizing the spinning operation. Gelation may be caused to take place at atmospheric or room temperature, since it is usually lower than the melting point of the gel, but it is in some cases, effective to cool the sol to promote its gelation. The appropriate control of humidity is effective for the precise control of the properties of the membrane to be manufactured.

The coagulating bath may comprise a substance which does not dissolve the polymers in the spinning solution, but is compatible with the solvent employed therein, or with a mixture thereof with the solvent in the spinning solution. In order to obtain a hollow fiber containing water, it is practically useful to choose for the spinning solution a solvent which is compatible with water, and to employ a coagulating bath composed of water or a mixture of water with that solvent. It is necessary to select the temperature of the coagulating bath appropriately, since it affects the permeability of the membrane. While a high temperature generally appears to provide a high degree of permeability, it is usually advisable to set the coagulating bath temperature to a value within the range of 0° C. to 98° C.

The hollow fiber membrane obtained according to this invention is carefully washed with water and dried after the water contained therein has been replaced by glycerin, ethylene glycol or the like. In some cases, it is useful to heat treat the membrane at a temperature of about 50° C. to 110° C. under tension, if required, in order to alter its permeability, or mechanical properties such as dimensional stability.

The hollow fiber membrane of this invention has a substantially circular hollow cross section, a uniform wall thickness in the range of about 5 to 500 microns, and an inside diameter of about 70 to 1,000 microns, depending on the purpose for which it is to be used.

Although the membrane of this invention is most suitable for medical applications as hereinbefore stated, it is also suitable for separation of fine particles having a variable shape from a suspension thereof, for separation of water from oil or from an emulsion, for concentration of milk particles, for concentration of a latex, or for purification of beer, wine, sake or juices, for example. It is also useful for filtration and clarification of suspended inorganic particles, sterile filtration, or for production of ultrapure water.

The invention will now be described more specifically with reference to the following examples, which are intended to be illustrative but not to define or to limit the scope of the invention, which is defined in the appended claims.

EXAMPLE 1

Five hundred g of methyl methacrylate and 26 g of sodium p-styrenesulfonate were dissolved in a mixed solvent composed of 400 ml of water and 1,600 ml of methanol. 1.25 g of 2,2'-azobis-(2,4-dimethylvaleronitrile) were added into the solution as a radical polymerization initiator. Polymerization was carried out at 55° C. for eight hours, whereby a copolymer I containing 2.7 mol % of p-styrenesulfonic acid and having a weight-average molecular weight of $1.8 \times 10^5$ was obtained. The molecular weight of the copolymer was obtained by single-point determination from a chloroform solution of polymethyl methacrylate having a polymer concentration of 0.5 g/100 ml of chloroform in accordance with the following equation showing its viscosity:

$$[\eta] = 4.8 \times 10^{-5} M^{0.8}$$

Likewise, 500 g of methyl methacrylate and 45 g of 2-methacryloyloxyethyltrimethylammonium chloride were dissolved in a mixed solvent composed of 400 ml of water and 1,600 ml of methanol, and 40 g of sodium chloride were added into the solution. Polymerization was carried out at 55° C. for eight hours in the presence of 1.5 g of 2,2'-azobis-(2,4-dimethylvaleronitrile), whereby a copolymer II containing 2.5 mol % of 2-methacryloyloxyethyltrimethylammonium chloride, and having a weight-average molecular weight of $5.1 \times 10^5$ was obtained in granular form.

Likewise, there was obtained a copolymer III containing 4.3 mol % of sodium p-styrenesulfonate and having a weight-average molecular weight of $3.8 \times 10^5$, a copolymer IV containing 2.8 mol % of sodium p-styrenesulfonate and having a weight-average molecular weight of $4.9 \times 10^5$, a copolymer V containing 2.6 mol % of 2-methacryloyloxyethyltrimethylammonium chloride and having a weight-average molecular weight of $5.0 \times 10^5$, and a copolymer VI containing 3.0 mol % of 2-methacryloyloxyethylyltrimethylammonium chloride and having a weight-average molecular weight of $5.2 \times 10^5$.

There was also prepared atactic polymethyl methacrylate having a weight-average molecular weight of $1.4 \times 10^5$ for viscosity control.

EXAMPLE 2

One part of the copolymer I was mixed with one part of the copolymer II, and the mixture was dissolved at 120° C. in a dimethylsulfoxide solvent containing 17% of glycerin to form a solution having a polymer content of 12%. The solution was cast at about 110° C. into the space defined between a pair of glass plates by a spacer having a thickness of 125 microns. The solution between the glass plates was cooled to room temperature, and coagulated in ice water, whereby a flat membrane A having a thickness of 90 microns, and which had lost clarity, was obtained.

The membrane A showed a pure water permeation rate (UFRS) of 24 liters/hr.m$^2$.mmHg, a membrane filtration rate (MFR) of 10 liters/hr.m$^2$.mmHg for an 0.2% aqueous solution of albumin, and an albumin permeability of at least 98%.

The membrane A was mounted in a thin channel filter (Amicon's TCF 2), and fresh rabbit blood containing 7 U/ml of heparin was caused to flow through the filter at a rate of 1 ml/min. and at a pressure of 50 mmHg. The membrane showed a plasma filtration rate of 60 ml/hr.m$^2$.mmHg, and a total protein permeability of at least 95%. No platelet or red blood cell was observed in the filtered plasma.

EXAMPLE 3

One part of the copolymer I obtained in Example 1 was mixed with one part of the copolymer II, and the mixture was dissolved at 120° C. in a dimethylsulfoxide solvent containing 17% of glycerin to form a spinning solution having a polymer content of 15%. The spinning solution was extruded through an annular orifice in a spinneret at a spinneret temperature of 105° C., while an aqueous solution of dimethylsulfoxide containing 10% of water was being injected into the hollow fiber being formed. The hollow fiber was caused to travel in the air over a distance of 12 cm, and was introduced into a coagulating bath composed of an aqueous solution containing about 10% of dimethylsulfoxide, having a temperature of about 90° C. After coagulation, the hollow fiber was passed through a bath of wash water and a bath of glycerin, and was wound at a rate of 20 m/min. The hollow fiber had an inside diameter of about 350 microns and had a wall thickness of about 70 microns.

A bundle of 10 hollow fibers thus obtained was placed in a small casing having an effective length of about 12 cm to form a test module having an effective surface area of 13 cm$^2$. The module was tested for permeability at a pressure of 50 mmHg, and showed a water permeation rate (UFR) of 8.1 liters/hr.m$^2$.mmHg, a filtration rate (MFR) of 3.8 liters/hr.m$^2$.mmHg for a 0.2% aqueous solution of albumin, and an albumin permeability of nearly 100%.

A bundle of 2,500 hollow fibers was placed in a casing having an effective surface area of 0.5 m$^2$. The module was tested for ex vivo perfusion on a dog weighing 16 kg at a blood flow rate of 100 ml/min. and a pressure of 20 to 30 mmHg. A plasma sampling rate was stabilized at 2.1 liter/hr to 2.0 liers/hr after three hours, and no hemolysis or clotting occurred. The quantity of total proteins in the filtered plasma was substantially equal to that of those obtained from blood by centrifugal separation. The membrane showed a permeability of at least 95% to all of albumin, globulin and lopoprotein. No platelet or red blood cell was observed in the filtered plasma. The ex vivo perfusion did not show any reduction in the dog's platelets and white blood cells.

EXAMPLE 4

One part of the copolymer I in Example 1 was mixed with one part of the copolymer II, and the mixture was dissolved at 130° C. in a dimethylsulfoxide solvent containing 25% of formamide to form a solution having a polymer content of 20%. The solution was cast into the space defined between a pair of glass plates by a spacer having a thickness of 125 microns at about 110° C. The solution between the glass plates was cooled to room temperature, and coagulated in warm water at 75° C., whereby a flat membrane B having a thickness of 120 microns, and which had lost clearity, was obtained.

The membrane B showed a pure water permeation rate (UFRS) of 54 liters/hr.m$^2$.mmHg, a filtration rate (MFR) of 18 liters/hr.m$^2$.mmHg for a 0.2% aqueous solution of albumin, and an albumin permeability of at least 98%.

EXAMPLE 5

One part of the copolymer I obtained in Example 1 was mixed with one part of the copolymer II, and the mixture was dissolved at 125° C. in a dimethylsulfoxide solvent containing 18% of formamide to form a solution having a polymer content of 20%. Then, the procedures of Example 2 were repeated for preparing a flat membrane C having a thickness of 110 microns, and which had lost clarity.

The membrane C showed a water permeation rate (UFRS) of 1.4 liters/hr.m$^2$.mmHg a filtration rate (MFR) of 0.9 liters/hr.m$^2$.mmHg for an 0.2% aqueous solution of albumin, and had an albumin permeability of 94%. It also showed a filtration rate (MFR) of 0.12 liter/hr.m$^2$.mmHg for a 0.2% physiological saline solution of $\gamma$-globulin (bovine, product of Seikagaku Kogyo Co., Ltd., Japan), and a $\gamma$-globulin permeability of 45%.

EXAMPLE 6

A spinning solution was prepared from a mixture of one part each of the copolymers I and II obtained in Example 1, dissolved in a dimethylsulfoxide solvent containing 14% glycerin. The solution had a polymer content of 15%. Then, the procedures of Example 3 were repeated for preparing hollow fibers each having an inside diameter of 380 microns and a wall thickness of about 85 microns.

A test module having an effective length of about 12 cm was formed from a bundle of 100 hollow fibers, and was tested for permeability. This hollow fiber module showed a water permeation rate (UFR) of 2.8 liters/hr.m$^2$.mmHg, a filtration rate (MFR) of 1.7 liters/hr.m$^2$.mmHg for a 0.2% aqueous solution of albumin at 25° C., 20 mmHg and an entering linear velocity of 10 cm/sec., and an albumin permeability of 96%. It also showed a filtration rate of 0.34 liter/hr.m$^2$.mmHg for a 0.2% physiological saline solution of γ-globulin, and a γ-globulin permeability of 68%.

EXAMPLE 7

A mixture of one part each of the copolymers II and IV obtained in Example 1 was dissolved in a dimethylsulfoxide solvent containing 14% of glycerin to prepare a spinning solution having a polymer content of 16%. The spinning solution was extruded through an annular orifice in a spinneret at a spinneret temperature of 102° C., while dry air was being injected into the hollow fiber being formed. The hollow fiber was caused to travel in the air over a distance of 30 cm, and was introduced into a coagulating bath composed of an aqueous solution containing about 10% dimethylsulfoxide, and having a temperature of about 40° C. After coagulation, the hollow fiber was passed through a bath of wash water and a bath of glycerin, and was wound at a rate of 60 m/min. The hollow fiber had an inside diameter of about 350 microns and had a wall thickness of about 80 microns.

A bundle of 10 hollow fibers was placed in a small casing having an effective length of about 12 cm to form a test module having an effective surface area of 13 cm$^2$. This hollow fiber module showed a water permeation rate (UFR) of 1.3 liters/hr.m$^2$.mmHg, a filtration rate (MFR) of 0.6 liter/hr.m$^2$.mmHg for a 0.2% aqueous solution of albumin at 25° C., 50 mmHg and an entering linear velocity of 5 cm/sec., and an albumin permeability of 68%. It also showed a filtration rate of 75 ml/hr.m$^2$.mmHg for bovine plasma under the same conditions as when the test had been conducted with an aqueous albumin solution. A considerable degree of separation between albumin and globulin was achieved, as the filtrate showed an albumin to globulin (A/G) ratio of 2.0, which had been 0.7 in the plasma.

EXAMPLE 8

A polymer mixture was prepared from three parts of copolymer I obtained in Example 1, two parts of copolymer V and one part of atactic polymethyl methacrylate having a weight-average molecular weight of $1.4 \times 10^5$, dissolved in a dimethylsulfoxide solvent containing 10% by weight of formamide under heat to form a solution having a polymer content of 20%. The casting procedures of Example 2 were repeated for preparing a flat semitransparent membrane D having a thickness of 130 microns. The permeability and mechanical properties of the membrane D are shown in Table 1 below.

EXAMPLE 9

A polymer mixture was prepared from three parts of copolymer I obtained in Example 1, two parts of copolymer V and one part of atactic polymethyl methacrylate having a weight-average molecular weight of $1.4 \times 10^5$, dissolved in a dimethylsulfoxide solvent containing 19% by weight of formamide and 1% by weight of polyoxyethyleneetherlauryl alcohol (Brij-35) with heat to form a solution having a polymer content of 20%. The casting procedures of Example 2 were repeated for preparing a flat, semitransparent membrane E having a thickness of 100 microns. The permeability and mechanical properties of the membrane E are shown in Table 1.

TABLE 1

|  | EXAMPLE 8 (Membrane D) | EXAMPLE 9 (Membrane E) |
|---|---|---|
| UFRS (ml/hr · m$^2$ · mmHg) | 117 | 1,880 |
| UFR for 0.2% albumin solution (ml/hr · m$^2$ · mmHg) | 95 | 879 |
| Albumin permeability (%) | 1.4 | 98 |
| UFR for 0.2% γ-globulin solution (ml/hr · m$^2$ · mmHg) | 83 | 28 |
| γ-globulin permeability (%) | 0 | 13 |
| Stress-strain test |  |  |
| Tensile strength (kg/cm$^2$) | 47.3 | 37.2 |
| Tensile elongation (%) | 152 | 60 |

EXAMPLE 10

A mixture of one part each of the copolymers I and II obtained in Example 1 was dissolved at 120° C. in dimethylsulfoxide to form a solution having a polymer content of 15%. The solution was cast at about 110° C. onto a glass plate provided with a spacer having a thickness of 125 microns, and was allowed to cool to room temperature. Then, the cast product was coagulated in ice water and in water having a temperature of 50° C. to form a flat membrane F having a thickness of 105 microns and a flat membrane G having a thickness of 120 microns, respectively.

A circular testpiece having a diameter of 43 cm was cut out from each of the membranes F and G and mounted in a stirring cell (Amicon's standard cell 52) for permeability evaluation. The results are shown in Table 2.

EXAMPLE 11

The procedures of Example 10 were repeated, except that the solution had a polymer content of 10%, and that the coagulating bath was composed of water at 4° C., whereby a flat membrane H having a thickness of 85 microns was obtained. The permeation properties of this membrane are shown in Table 2.

TABLE 2

| Semipermeable membrane | UFR ml/hr · m$^2$ · mmHg) | Albumin permeability (%) |
|---|---|---|
| F | 45 | 0.1% or below |
| G | 115 | " |
| H | 1,400 | 0.2% |

EXAMPLE 12

A mixture of one part each of the copolymers I and II obtained in Example 1 was dissolved at 120° C. in dimethylsulfoxide to prepare a solution having a polymer content of 18%. The procedures of Example 2 were repeated, except that a coagulation bath of water having a temperature of 4° C. was employed, whereby a flat membrane J having a thickness of 130 microns was obtained. The permeation properties of the membrane J are shown in Table 3 below.

EXAMPLE 13

A mixture of one part each of the copolymers II and III obtained in Example 1 was dissolved at 120° C. in dimethylsulfoxide to prepare a solution having a polymer content of 15%. The procedures of Example 2 were repeated, except that a coagulating bath of water having a temperature of 4° C. was employed, whereby a flat membrane K having a thickness of 120 microns was obtained. The permeation properties of this membrane are also shown in Table 3.

TABLE 3

|  | J | K |
|---|---|---|
| Semipermeable membrane UFR (ml/hr · m$^2$ · mmHg) | 12 | 3.1 |
| Permeability coefficient P$_2$ × 10$^6$ (cm$^2$/sec.) |  |  |
| Urea | 7.4 | 7.2 |
| Vitamin B$_{12}$ | 1.7 | 1.4 |
| 0.2% albumin solution |  |  |
| UFR (ml/hr · m$^2$ · mmHg) | 10 | 2.7 |
| Permeability (%) | 0.1 or below | 0.1 or below |

EXAMPLE 14

A mixture of one part each of the copolymers III and VI obtained in Example 1 was dissolved at 120° C. in dimethylsulfoxide to prepare a spinning solution having a polymer content of 16%. The procedures of Example 7 were repeated, except for the use of a coagulating bath having a temperature of 4° C., whereby hollow fibers each having an inside diameter of about 220 microns and a wall thickness of about 30 microns were obtained. A bundle of 9,000 hollow fibers was placed in a hollow fiber artificial kidney casing having an effective length of 190 mm in a customary manner to form a module having an effective surface area of 1.2 m$^2$. The properties of this module are shown in Table 4.

Table 4 also shows, for comparison purposes, the catalog values of the properties of a Cordis-Dow C-DAK Model 1, 3 module which is a typical artificial kidney employing a cellulose hollow fiber membrane.

TABLE 4

|  | EXAMPLE 4 | COMPARATIVE EXAMPLE (C-DAK 1,3) |
|---|---|---|
| Effective surface area of the membrane (m$^2$) | 1.2 | 1.3 |
| UFR (ml/hr · m$^2$ · mmHg) | 4.2 | 2.0 |
| Clearance in vitro |  |  |
| Urea | 175 | 160 |
| Vitamin B$_{12}$ | 70 | 23 |
| Albumin permeability (%) | 0.1 or below | 0.1 or below |

EXAMPLE 15

The flat membranes A, C, D, E and J obtained in Examples 2, 5, 8, 9 and 12, respectively, were tested for blood compatibility. A circular testpiece having a diameter of 43 mm was cut out from each of the membranes. It was immersed in 10 ml of fresh blood obtained from the carotid artery of a rabbit, and containing 6 U/ml of heparin, and was left therein at 37° C. for 30 minutes while the blood was being shaken slowly at a rate of 120 times per minute. Then, each testpiece was washed in an isotonic sodium chloride solution for three minutes while the solution was being shaken slowly at a rate of 120 times per minute. After it had been fixed with formalin, the testpiece was examined through an electron microscope. Although the membrane J showed slight adhesion of platelets thereto, hardly any platelet adhesion was observed on any of the other membranes A, C, D and E.

We claim:

1. A ionically crosslinked polymethyl methacrylate separation membrane which is impermeable to red and white blood cells and platelets having an albumin permeability of at least about 30%, and having a water permeation rate of about 0.1 to 60 liters/hr.m$^2$.mmHg.

2. The membrane defined in claim 1, wherein said membrane comprises a mixture of a methyl methacrylate copolymer (A) containing about 0.5 to 10 mol % of a monomer having sulfonate groups, and a methyl methacrylate copolymer (B) containing about 0.5 to 10 mol % of a monomer having quaternary nitrogen-containing groups, the numbers of the sulfonate and the quaternary nitrogen containing groups in the copolymers having a ratio of about 5:1 to 1:5.

3. The membrane defined in claim 2, wherein said monomer having sulfonate groups is selected from the group consisting of p-styrenesulfonic acid, allylsulfonic acid, methacrylsulfonic acid, 3-methacryloxypropanesulfonic acid, vinylsulfonic acid, 3-acryloxypropanesulfonic acid, and 2-acryl-amino-2-methylpropanesulfonic acid and the sodium, potassium, ammonium and pyridine salts thereof.

4. The membrane defined in claim 2, wherein said monomer having sulfonate groups is sodium p-styrenesulfonate.

5. The membrane defined in claim 2, wherein said monomer having a quaternary nitrogen-containing group is selected from the group consisting of 2-methacryloyloxy ethyltrimethylammonium chloride, 2-methacryloyloxyethyl triethylammonium chloride, dimethyl (2-methacryloyloxyethyl)phenylammonium chloride, 2-acryloxyethylammonium chloride, 2-hydroxy-3-methacryloyloxypropyltrimethylammonium chloride, vinylbenzyltrimethylammonium chloride, and methy(2-methyl-5-vinyl)pyridinium chloride, and bromides, iodides, sulfates and sulfonates instead of said chlorides.

6. The membrane defined in claim 2, further including in the copolymer a vinyl monomer.

7. The membrane defined in claim 2, wherein said ratio is about 2:1 to 1:1 so that the membrane is anionic or neutral.

8. The membrane defined in claim 2, wherein said copolymers (A) and (B) have a weight-average molecular weight of at least about 100,000 when they are mixed.

9. The membrane defined in claim 8, wherein said molecular weight is about 200,000 to 800,000.

10. The membrane defined in claim 1 in the form of a hollow fiber.

11. A method of manufacturing the separation membrane of claim 1, which comprises:
   mixing a methyl methacrylate copolymer (A) containing about 0.5 to 10 mol % of a monomer having sulfonate groups, and a methyl methacrylate copolymer (B) containing about 0.5 to 10 mol % of a monomer having quaternary nitrogen-containing groups in a ratio of weight of about 1:9 to 9:1;
   dissolving the mixture of said copolymers (A) and (B) in at least one solvent to prepare a solution containing about 4 to 40% by weight of said copolymers; and forming a membrane from said solution.

12. The method defined in claim 11, wherein said solvent is selected from the group consisting of dimethylsulfoxide, dimethylformamide, dimethylacetamide and N-methyl-2-pyrrolidone.

13. The method defined in claim 11, further comprising adding to said solvent at least one substance selected from the group consisting of water, formamide, alcohols, urea, calcium chloride, polyoxyethyleneetherlauryl alcohol, isooctyl phenoxypolyethoxy ethanol and polyethylene glycol.

14. The method defined in claim 11, wherein said membrane is a hollow fiber membrane, and wherein said forming operation comprises:

maintaining said solution at a temperature of at least about 50° C.;

extruding said solution through a hollow fiber spinneret; and coagulating the product of said extrusion.

15. The method defined in claim 14, wherein said spinneret is substantially centrally provided with a thin tube defining an annular orifice therearound, said method further including injecting into said thin tube a substance selected from the group consisting of said solvent, a mixture of said solvent with water, a mixture of said solvent with a polyhydric alcohol, air and inert gas.

16. The method defined in claim 14, further including the step of causing said extrusion product to travel a distance of about 0.1 to 200 cm through an atmosphere selected from the group consisting of air and an inert gas before it is introduced into the coagulating bath.

17. The method defined in claim 14, wherein said coagulating step is performed with a coagulating agent selected from the group consisting of water and a mixture of said solvent and water, said coagulating agent having a temperature of about 0° C. to 98° C.

18. The method of manufacturing the separation membrane of claim 1, which comprises:

mixing a methyl methacrylate copolymer (A) containing about 0.5 to 10 mol % of a monomer having sulfonate groups, and a methyl methacrylate copolymer (B) containing about 0.5 to 10 mol % of a monomer having quaternary nitrogen-containing groups so that the number of said sulfonate groups in the mixture of said copolymers has a ratio of about 5:1 to 1:5 to that of said quaternary nitrogen-containing groups;

dissolving said mixture in a solvent selected from the group consisting of dimethylsulfoxide, dimethylacetamide, N-methyl-2-pyrrolidone and dimethylformamide, and containing a compound selected from the group consisting of glycerin, water, calcium chloride and formamide to prepare a solution containing about 4 to 40% by weight of said copolymers; and forming a membrane from said solution.

19. The method defined in claim 18, wherein said membrane is composed of hollow fibers, and wherein said forming operation comprises:

maintaining said solution at a temperature of at least about 50° C.;

extruding said solution through a hollow fiber spinneret; and coagulating the product of said extrusion.

* * * * *